United States Patent [19]

Tillac

[11] 4,191,344
[45] Mar. 4, 1980

[54] DEVICE FOR CAUSING ROTATION, HAVING A PRESSURIZED TUBULAR DRIVE MEANS

[75] Inventor: Jean-Francois Tillac, Bordeaux Cauderan, France

[73] Assignee: Societe Nationale des Poudres et Explosifs, Paris, France

[21] Appl. No.: 893,945

[22] Filed: Apr. 6, 1978

[30] Foreign Application Priority Data

Apr. 20, 1977 [FR] France ................................ 77 11940

[51] Int. Cl.² ...................... A62B 35/00; B65H 75/48
[52] U.S. Cl. .............................. 242/107; 242/107.4 R; 280/807; 297/476
[58] Field of Search ........................... 242/107–107.7, 242/55, 67.1 R; 280/744–747; 180/82 C; 297/388; 244/122 B; 254/158, 175.5; 92/91, 92

[56] References Cited

U.S. PATENT DOCUMENTS

| | | | |
|---|---|---|---|
| 3,481,253 | 12/1969 | Floyd ...................................... | 92/91 X |
| 3,695,148 | 10/1972 | Baginski et al. ........................ | 92/92 |
| 3,871,470 | 3/1975 | Scwanz et al. ........... | 242/107.4 R X |
| 3,976,257 | 8/1976 | Fohl ................................. | 242/107 X |

*Primary Examiner*—John M. Jillions
*Attorney, Agent, or Firm*—Bucknam and Archer

[57] ABSTRACT

A device for causing the rotation of a movable element which is connected to a displaceable component such as a safety belt used for protecting people in a vehicle is described. The rotary device includes drive means which comprises at least one flexible tube which is rolled up and can be expanded under the action of a pressurized fluid, and, preferably, the pressurizing component is a pyrotechnic gas generator placed inside the flexible tube which is rolled up in a helix or a spiral. The device may be used for protection of an individual in a moving vehicle by means of a safety belt. The device can be actuated by a collision detector.

22 Claims, 15 Drawing Figures

FIG_13

FIG_14

FIG_15

DEVICE FOR CAUSING ROTATION, HAVING A PRESSURIZED TUBULAR DRIVE MEANS

The present invention relates to a device for causing the rotation of a movable element which is connected to a displaceable component such as a safety belt used for protecting people in a vehicle.

Such devices comprise: a frame which can be fixed to the chassis of the vehicle, a drum for winding the belt, means for arresting the winding of the belt or for blocking this drum, if desired, means for causing the drum to rotate in the direction of winding of the belt, and triggering means which are connected to a collision detector and are capable of pressurising a pressure chamber which generally comprises a bore closed by a movable piston.

Safety belt retractors used for protecting people in vehicles have been known for several years. These retractors make it possible to tighten the safety belt, which is in contact with the person to be protected, only when a collision takes place, which allows the driver or passengers great freedom of movement whilst the vehicle is under normal conditions, since the belt is only subjected to a small return force of the roller.

A first group of these retractors comprises linear traction pyrotechnic jacks, the extended lengths of which impede their positioning in the passenger spaces of the vehicles and, moreover, cause risks of accidents by carelessness when the system is extended, which is the normal position as long as a collision does not take place.

A second group of these retractors comprises devices for causing rotation, but the existing devices most frequently comprise a piston extended by control components actuating a transmission system which can be either a rack and pinion unit or a helical ramp unit. Such devices occupy a large amount of space because of the use of a transmission system placed in the extension of the piston.

In the second group of these retractors, comprising devices for causing rotation, there must be mentioned: on the one hand, turbine rollers, described in French Pat. No. 2,136,755, but these turbine rollers do not make it possible to develop a high torque and they further require the combustion gases to be discharged at high temperature, and, on the other hand, rollers which have a releasable annular piston inside the winding drum and are described in French Pat. No. 2,279,429, the piston of which rollers is both a drive element and an element for causing rotation, but this type of roller only has a limited energy efficiency due to the low pitch of the helical guiding element which is inside the drum.

As the retraction of the safety belts must be effected within times of the order of 10 milliseconds, and as the retractors must occupy a reduced amount of space, the drive gases are used at pressures of several hundred bars and generally result from the ignition of a pyrotechnic charge which is placed in the retractor. The use of gas at high pressure gives rise to a very high operating sound level when the drive gases are ejected from the retractor, and any leakage of gas causes a significant increase in the operating sound level, even when there is no appreciable influence on the retraction characteristics.

The present invention makes it possible to overcome these disadvantages and aims, in particular, to produce a device for causing rotation, which occupies a small amount of space, has a high energy efficiency, does not expel any combustion gas and operates virtually without noise. Furthermore, the invention results in a device having a lower cost, because the drive means and the means for causing the rotation of the drum comprise one and the same piece which does not require any precise machining and which makes it possible to obtain absolute leaktightness directly.

For a rotary device of the abovementioned type, and whatever the intended application may be, this aim is achieved, according to the invention, by virtue of the fact that this device is characterised in that the drive means comprises at least one flexible tube which is rolled up so as to have a reduced cross-section and which can be expanded under the action of a pressurised fluid, this tube being connected at not less than two different portions, on the one hand to the case which guides the rotation of a movable element, and on the other hand to this movable element, this tube being joined to a pressurising component.

The movable element can be a drive axle to which the displaceable component is fixed, but for the applications to the retraction of a safety belt, the movable element is preferably a drum for winding the belt. In the context of this preferred application, the pressurised fluid is a gas and the pressurising component is a gas generator, and more particularly a pyrotechnic gas generator, which can even be arranged directly inside the flexible tube, this generator then being ignited electrically.

The flexible tube advantageously comprises at least one metal wall to allow high pressure operation, and this tube can be entirely made of metal and can comprise, for example, two laterally welded strips, an embodiment of this type resulting in a rotary device which occupies a small amount of space, but the expansion of the cross-section of which is restricted because of the mechanical characteristics of the metal. In order to allow a large expansion of the cross-section, the flexible tube comprises at least one wall made of a rubbery material or a plastic and, more particularly, the flexible tube comprises one wall made of braided metal wires, this wall being covered on the inside by a wall made of a rubbery material or a plastic.

At least one of the different attachment portions of the flexible tube is preferably situated towards one of the ends of this flexible tube, and the drive means preferably comprises only a single flexible tube.

According to a first possible embodiment, the flexible tube is rolled up in a helix.

According to a second possible embodiment, the flexible tube is rolled up in a spiral.

These two possible embodiments can make use of a tube which is either rolled up around an axle or rolled up inside a rotatable drum, but when the tube is rolled up in a spiral, it is advantageously rolled up around an axle.

According to a particular configuration, the flexible tube is bent back on itself to form two lengths before being rolled up in a helix or in a spiral, one of the different attachment portions being situated in the curved zone and two other different attachment portions being situated towards the two ends of this flexible tube, it being possible for the two lengths to be, for example, rolled up in two helices of opposite pitch.

According to a first method of construction, the frame is prevented from rotating by being firmly held to a fixed chassis which is, for example, the chassis of the motor car in the preferred application to the retraction of safety belts; in this case, the rotary device can be either independent, and it then constitutes the retractor of the dynamic unit for protection by means of a safety belt, it being furthermore possible to use a roller which constantly draws the belt back in contact with the person to be protected, and the belt either being fixed to the winding drum or engaged in this drum, whilst being able to slide inside this drum which only rotates at the time when the flexible tube is pressurised, or it can be connected to a safety belt roller, whereby the unit constitutes a roller-retractor and the belt is fixed to the winding drum, which can rotate in both directions as long as the flexible tube is not pressurised, but which can only rotate in the direction of retraction of the belt when this tube is pressurised, any return to the reverse position being blocked by a blocking component which uses a clutch inserted between the drive means of the rotary device and the movable element comprising the winding drum.

According to a second method of construction, the frame is rotatable, when the flexible tube is pressurised by fluid, and cooperates with the winding of the displaceable component, it being possible for a temporary fixing of low strength to initially hold the frame of the rotary device firmly to a fixed chassis.

As long as the pressure is maintained in the flexible tube, the drive means tends to keep the rotary device in the position of maximum retraction, but when gases are used which are initially at a high temperature and their temperature drops rapidly, and/or when the device must subsequently be subjected to a very high torque returning it to its initial position of minimum retraction, which is the case in the preferred application to the retraction of safety belts, it can then be advantageous if the drive means is totally irreversible and if it consequently comprises a uni-directional component for blocking rotation, which makes it possible for the frame and the movable element (the drum) to move relative to one another when the flexible tube is pressurised by fluid, or if the drive means is partially reversible and comprises a uni-directional component for absorption of energy, which makes it possible, after the flexible tube has been pressurised by fluid, for the movable element to return to its initial position before the flexible tube was pressurised by fluid; such uni-directional absorption components are in themselves known, both in retractors of the linear jack type and in retractors of the rotary drive device type, and they use, for example, inlaid balls.

Other characteristics and advantages of the invention are clarified by the following description of several embodiments, with reference to the attached drawing in which.

Figures 1, 2, 3:
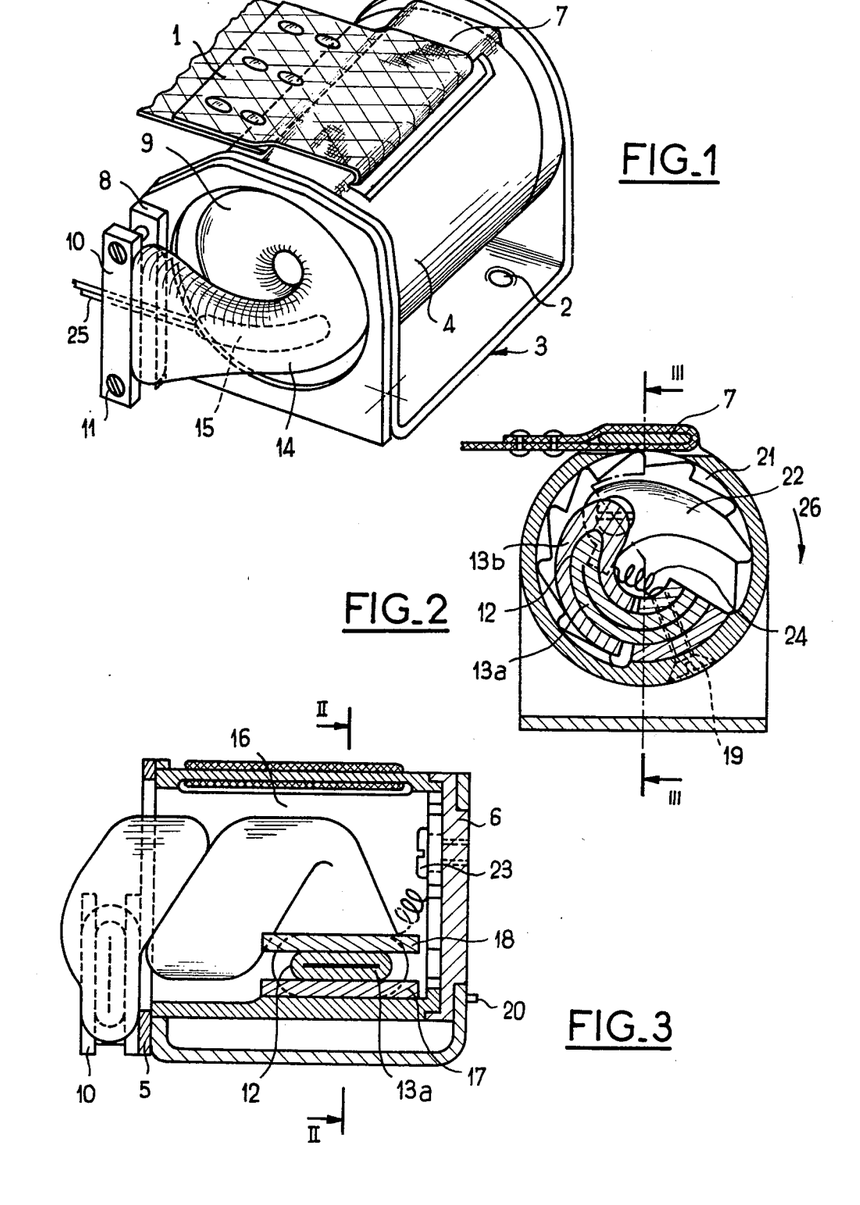
FIG. 1 is a view in perspective of a first rotary device according to the invention, which is intended to constitute retractor which is firmly held to the chassis of the vehicle.
FIG. 2 is a transverse cross-section of the first device, along II—II of FIG. 3.
FIG. 3 is an axial longitudinal cross-section of the first device.

With reference to FIGS. 1 to 3, the rotary device makes it possible to cause the rotation of the safety belt (1) and constitutes a retractor which is fixed to the chassis of the vehicle by means of the four tapped holes (2) of the frame (3), which frame, in the longitudinal direction, essentially forms a U into which the winding drum (4) penetrates. The side walls of the frame are each strengthened by a side piece (5) and (6) in order to provide the centering bearing surfaces and the longitudinal positioning of the winding drum which is a hollow cylinder equipped with a boss (7) in which two longitudinal slits are made to enable the belt (1) to be fixed. The side support piece (5) comprises a support (8) by which the end of the flexible tube (9) is fixed using the clamp (10) and the two screws (11). The flexible tube is a tube which resists high pressure and comprises an internal metal strap (12), made of braided steel wires, which is covered, on the inside and outside, with a layer of neoprene rubber (13a) and (13b), the outer layer (13b) being drawn back at each of the ends of this tube in order to facilitate fixing. The tube is rolled in a helix inside the drum and it is flattened so that the cross-section of the inner passage is reduced to a thin oblong opening having a free height of one millimeter, with the exception of the zone (14) which corresponds to the transition between the inner helix and the external straight portion which enables the tube to be fixed to the support (8). This zone, in which the passage is wider, contains an internal pyrotechnic generator (15) which comprises 2.5 grams of monotubular powder containing nitrocellulose and 1 gram of ignition powder containing zirconium, which are in contact with an electrical ignition apparatus connected to the collision detector (not shown) by means of two flat, insulated, electrical conductors (25) which are enclosed by the inner layer of neoprene, making it possible to obtain adequate leak-tightness. The flexible tube, deformed by flattening, forms a helix, the outer surface envelope of which provides adequate clearance (16) with the inner surface of the winding drum, so that the tube can have a circular transverse cross-section when this tube is subjected to the high pressure of the gases evolved by the internal generator (15). The inner end of the flexible tube is fixed to the winding drum by means of a support (17), a clamp (18) and two screws (19), and the tube under initial stress is held in the shape of a helix by means of a shear pin (20) which temporarily attaches the drum to the side blocking piece (6). The rotary device comprises a uni-directional blocking component consisting of a ring of interference teeth (21) which is provided at the end of the drum and which is in constant contact with a pawl (22), which pawl can oscillate around the axis (23) and is biased into engagement with the teeth by the spring (24) stretched between the clamp (18) and the rear of the pawl.

In operation, when the collision detector sends an electrical impulse to the conductors (25), the pyrotechnic generator evolves, at high temperature, an amount of gas which makes it possible to create a pressure of about 250 bars in the flexible tube having initial inner and outer diameters of 13 mm and 23 mm and a total length of 300 mm, which makes it possible to form two turns around a central axle having a diameter of 15 mm, the flexible tube being virtually totally flattened in its initial position. The more the pressure increases in the flexible tube, the more the latter tends to return to a circular cross-section which is a little greater than the initial cross-section, because of the deformability of the braided metal strap, and this expansion of volume together with the increase in pressure develops a considerable stress on the belt, the winding drum being subjected to a torque which results from the increase in the diameter of the mean fibre of the tube, and which, after the pin (20) has broken, causes the drum to rotate until the pressurised flexible tube comes into contact with the inner surface of the drum, the traction force developed on the belt then being of the order of 350 decaNewtons, the retraction length being about 100 millimeters and the duration of the operation being less than 10 milliseconds. During the rotation of the drum, which is effected in the direction of the arrow (26) in FIG. 2, the pawl is pulled down on passing each interference tooth, but, as soon as the maximum retraction distance is achieved, the pawl locks into the last tooth reached, and the whole of the rotary device is immobilised in its final position.

FIGS. 4 to 10 refer to two examples of a second rotary device, these two examples differing only by the uni-directional blocking component. According to these two examples, the rotary device makes it possible to cause the rotation of a safety belt (30), which slides freely in a buckle (31), which buckle constitutes the main movable element and is fixed to a central tube (32) by means of the two screws (33). In order to make FIGS. 4 and 5 easier to understand, the buckle has not been drawn and its assembly has been shown in detail in FIG. 6, this buckle enabling the two ends (34a) and (34b) of the flexible tube (48) to be fixed. This single flexible tube is bent back on itself to form two lengths before being rolled around the central tube (32) whilst being partially flattened in order to deform its cross-section, and the two ends of this neoprene tube, which has a metal core, are stripped of the outer layer of neoprene and are placed on top of one another halfway along the central tube, the two lengths of the flexible tube being rolled up with opposite turns towards the ends of the central tube, and the central part of the flexible tube being engaged in the groove of the central support (35) of the frame which, longitudinally, is in the shape of a U. This frame comprises two side walls (36) and (37) which are connected by the central support (35) and by the axle (38) around which the central tube (32) can swivel, this axle and this tube being temporarily immobilised by a shear pin (not shown). The pyrotechnic generator (39) is placed inside the flexible tube which is only partially flattened and therefore has an internal passage of oblong cross-section, whereas the cross-section of the tube is circular in the absence of stress, this generator comprising an ultra-rapid ignition apparatus (40) connected to two flat conductors (41), and the ignition powder containing zirconium (42) being placed, around this ignition apparatus, in a sachet (43) which is contained in the outer flexible holder filled with 2 grams of monotubular powder (44) containing nitrocellulose.

Figure 4:
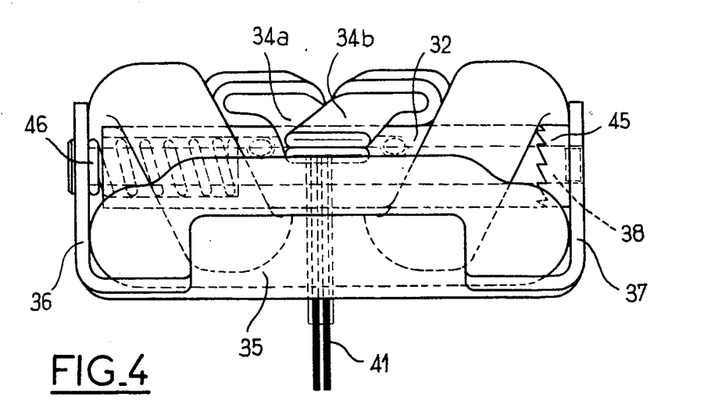
FIG. 4 is an outside longitudinal view of a first example of a second rotary device according to the invention, which is intended to constitute a retractor, the frame of which cooperates with the winding of a displaceable component.
Figure 5:
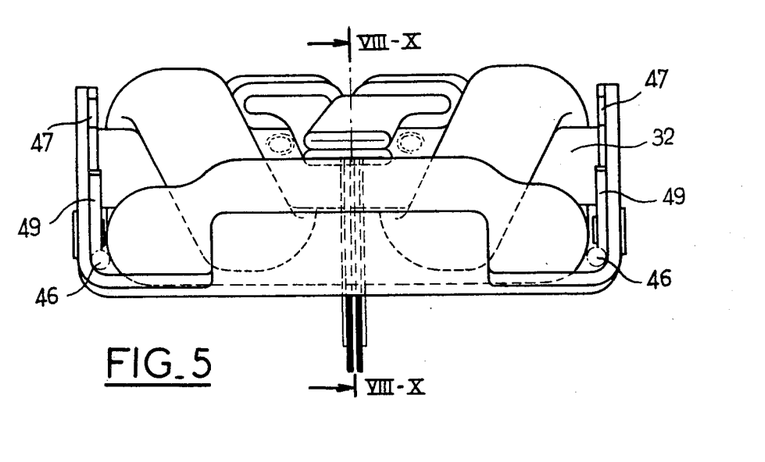
FIG. 5 is an outside longitudinal view of a second example of a second device which is similar to that shown in FIG. 4.
Figure 6:
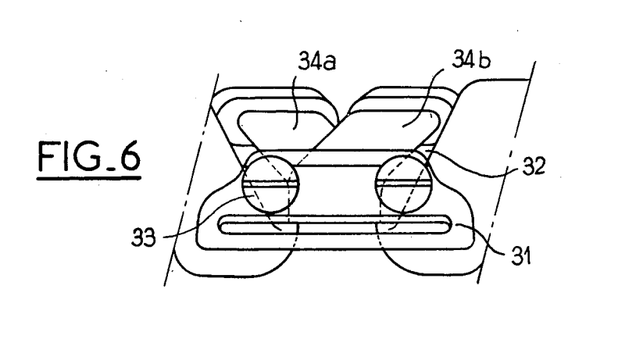
FIG. 6 is a partial view of the movable element which is not shown in FIGS. 4 and 5.
Figure 7:
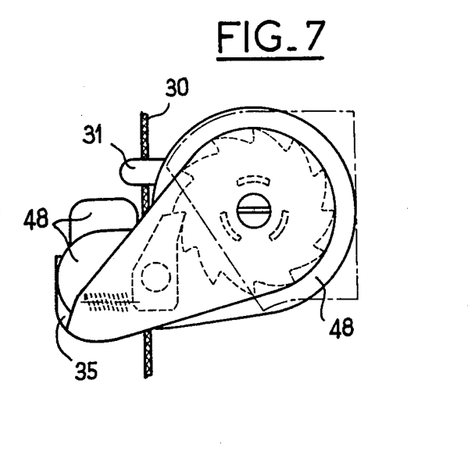
FIG. 7 is an outside lateral view of the second example of the second device shown in FIG. 5.

According to the example shown in FIG. 4, the uni-directional blocking component is a ratchet wheel with asymmetrical teeth, which is formed, on the one hand, by a ring (45) firmly held to the side wall (37) and, on the other hand, by the central tube (32) which is equipped with teeth at one end and which possesses, at the other end, an internal bore in which a spiral spring (46) is held, which spring is compressed between the bottom of this bore and the sidewall (36). According to the example shown in FIGS. 5 and 7, the uni-directional blocking component comprises two wheels with asymmetrical teeth (47), which are centered on the side walls (37) and which are engaged with the pawls (49) which are constantly biased by the springs (46). The main advantage of this second device is that it makes it possible to produce a force for retracting the safety belt which is twice as large as the force produced with a flexible tube which has the same length and is rolled up in a single helix, but it is quite obvious that the distance is essentially reduced by half because the energy provided by the drive gases is identical.

Figure 8:
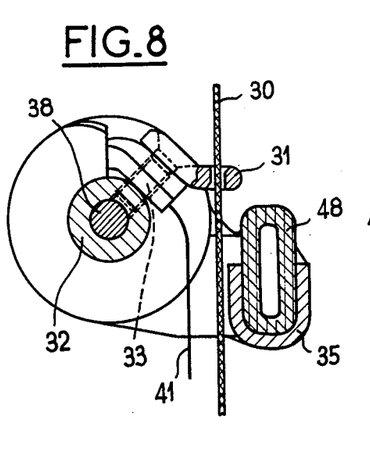
FIG. 8 is a transverse view, in partial cross-section, along VIII—VIII of the second example of the second device shown in FIG. 5 in its initial position, before the flexible tube is pressurised.
Figures 9, 10:
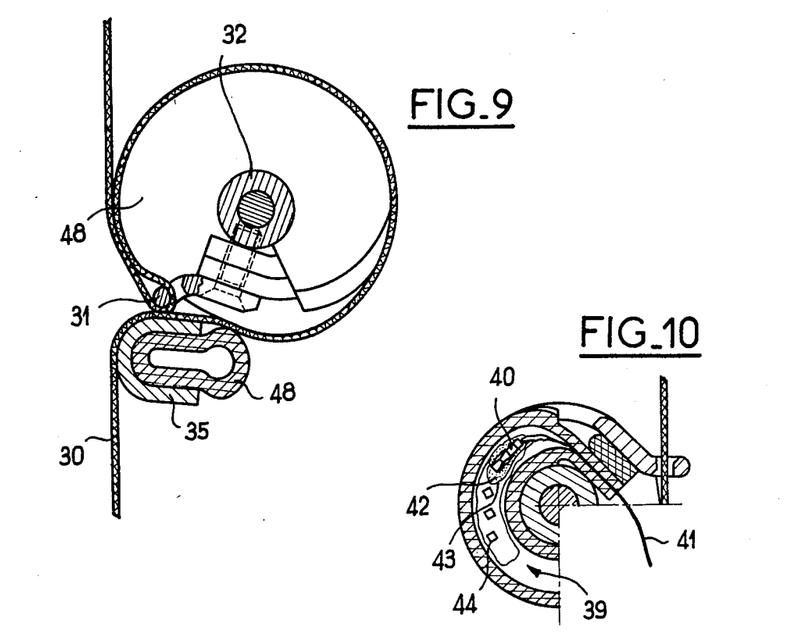
FIG. 9 is a transverse view, in partial cross-section of the second example of the second device, this cross-section corresponding to FIG. 8 and showing the device in its final position, after the flexible tube has been pressurised.
FIG. 10 is a partial transverse cross-section along X—X of the second example of the second device shown in FIG. 5.

The operation of such a device is apparent from an examination of FIGS. 8 and 9 which show the same retractor in its initial position before the flexible tube (48) is pressurised, and in its final position after the flexible tube has been pressurised, respectively. The safety belt (30) can slide in the buckle (31), and the retractor is temporarily held in position by a clip made of flexible plastic (shown by a dot-and-dash line in FIG. 7) which is firmly held to the chassis of the vehicle, the general configuration and the operation of such a device having already been described in patent applications. When the vehicle is subjected to a sudden deceleration, the collision detector sends an electrical impulse to the conductors (41) and triggers off the ignition apparatus (40) which fires the ignition powder (42) and the powder containing nitrocellulose (44). The gases produced by the pyrotechnic generator increase the internal pressure in the flexible tube and tend to dilate this tube so that it resumes its equilibrium shape of circular cross-section, which induces axial traction on the rolled up tube. As soon as this traction is sufficient, the shear pin, which held the central support (35) and the buckle (31) in their relative position, is broken and the relative rotation of these two pieces starts, even before the frame escapes from the flexible plastic clip. After this escape, the whole retractor is totally free and the relative rotation continues up to the equilibrium position which still corresponds to the alignment of the two lengths of the retracted belt.

FIG. 9 shows the maximum winding which it is possible to obtain, since the buckle (31) is blocked on the central support (35) by means of the belt which is wound directly onto the pressurised flexible tube (48).

FIGS. 11 to 15 show other variants of the rotary device which make it possible to cause the rotation of a drum for winding a safety belt and, according to these variants, the rotary device is combined with a safety belt roller (not shown) so as to form a roller-retractor which is firmly held to the chassis of the vehicle. The roller, which is in itself known, is of the spiral spring type and possesses a wheel having dissymmetrical notches in which a pawl, controlled by a deadweight, can be engaged. During rotation, this wheel is firmly held to a winding drum which is subjected to the return force exerted by the spring, and this drum can rotate freely as long as the drum does not exceed a predetermined maximum speed or as long as the vehicle does not undergo a sudden deceleration, the deadweight then engaging the pawl in the notched wheel in order to prevent any rotation from occurring in the direction of unwinding of the belt, the reverse rotation being allowed, however, because of the dissymmetry of the teeth. The retractor according to the present invention is combined with the roller in the sense that the winding drum is common to both and is therefore subjected to the operating conditions of the roller, the safety belt being fixed to this drum.

Figure 11:
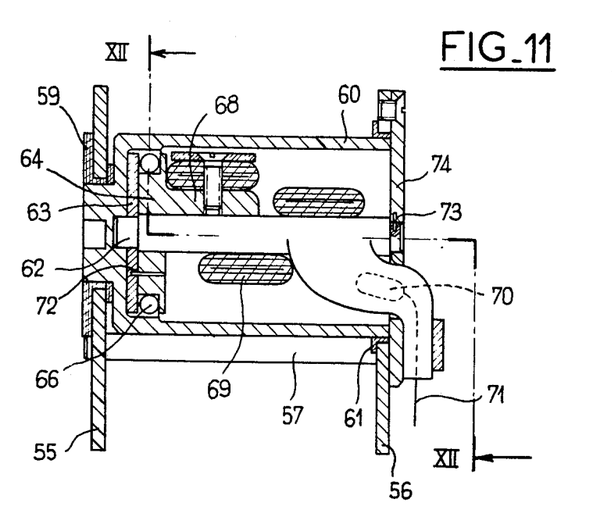
FIG. 11 is an axial longitudinal cross-section, along XI—XI of FIG. 12, of a third rotary device according to the invention, which is intended to be combined with a safety belt roller so as to form a roller-retractor which is firmly held to the chassis of the vehicle.
Figure 12:
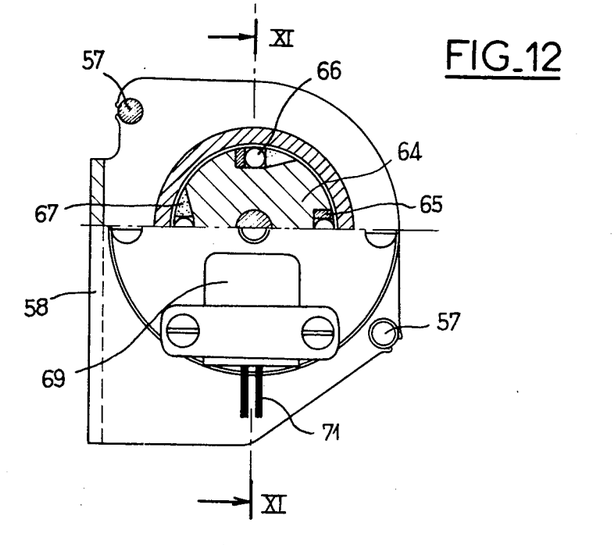
FIG. 12 is a lateral view, in half-section along XII—XII of FIG. 11, of the said device shown in FIG. 11.

According to FIGS. 11 and 12, which show a third rotary device, the frame comprises two side plates (55) and (56) which are connected by two cross-pieces (57) and by a drilled base-plate (58) which makes it possible to fix this frame to the chassis of the vehicle. The side plate (55) possesses a circular opening which makes it possible to position the roller by means of the flanged plate (59) and to centre the winding drum (60) which is also centered by the ring (61) which is forced into the side plate (56), a closing plate (74) being screwed into this side plate. The winding drum contains the drive means which comprises an axle (62) which is concentric with the drum, is centered on the closing plate and forced into the control disc (63), a clutch disc (64) which possesses four sloping slots in which the lugs (65) of the control disc, the clutch balls (66) and the deformable wedges (67) are arranged, this disc being extended by a fixing segment (68), a flexible tube (69) which resists high pressure, is totally flattened and is rolled up in a helix around the axle (62), this tube being fixed by clamps at its two ends, on the one hand to the segment (68) of the clutch disc, and on the other hand to the closing plate (74) through which the flexible tube passes, and a pyrotechnic generator (70) which is situated inside the flexible tube and which is connected to the collision detector by the conductors (71).

The flexible tube is held in a rolled up position on the axle (62) by means of two shear pins, the pin (72) of low strength connecting the control disc (63) to the clutch disc (64), and the pin of greater strength (73) immobilising the axle (62) relative to the closing plate (74).

In the case of sudden deceleration, the deadweight and the ratchet of the roller block the rotation of the drum in one direction, whilst the collision detector, which can use the same deadweight, sends an electrical impulse to the conductors (71) and fires the pyrotechnic charge of the gas generator. The axial traction which is exerted on the flexible tube and which results from the dilation of this flattened tube initially shears the pin (72), and the clutch disc (64) then starts to rotate, whilst the control disc (63) is still held fixed, during rotation, because it has been forced onto the axle (62), and by means of the pin (73), which results in engaging the blocking balls (66) on the locking ramps of the slots of the disc (64) by compressing the deformable wedges (67). As soon as the balls engage, the clutch disc (64) becomes firmly held, in one direction, to the winding drum (60), and the axial traction which is exerted on the flexible tube therefore causes the rotation of the winding drum which is immobilised in its final position by the wheel, with dissymmetrical notches, of the roller.

Figure 13:
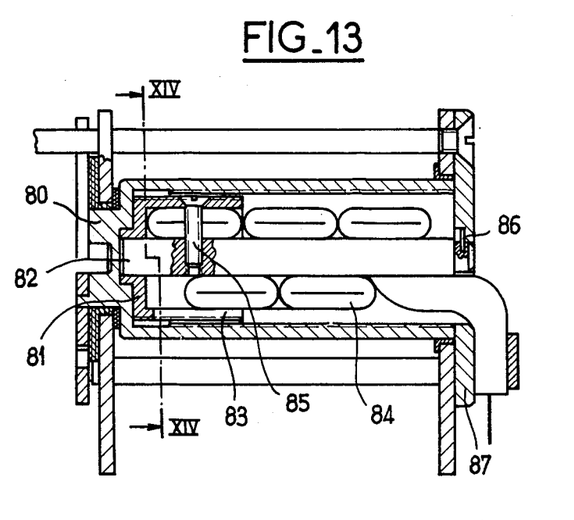
FIG. 13 is an axial longitudinal cross-section of a fourth rotary device according to the invention, which is intended to be combined with a safety belt roller so as to form a roller-retractor which is firmly held to the chassis of the vehicle.
Figure 14:
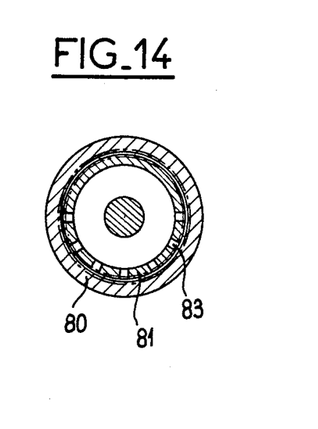
FIG. 14 is a transverse cross-section, along XIV—XIV of FIG. 13, of the winding drum equipped with a special clutch.

FIGS. 13 and 14 show a fourth rotary device, the method of production of which is very similar to that of the third device, the essential difference arising from the clutch component of the drive means. In fact, when using this clutch component, the internal surface of the winding drum (80) is rigid in the longitudinal direction, and a rigid expandable cylinder (81) is centered inside the drum by means of the central axle (82). This expandable cylinder, which is made of a deformable material, possesses numerous longitudinal weakening grooves (83) and it is firmly held to the central axle and the flexible tube (84) by means of the screw (85), this axle itself being prevented from rotating by the shear pin (86) which rests on the closing plate (87). In normal operation, the winding drum can rotate freely, but in the case of sudden deceleration, when the flattened flexible tube dilates under the pressure of the gases of the pyrotechnic charge, the expandable cylinder is pushed outwards and the ridges on its outer surface engage with the internal ridges of the winding drum, thus forming an engaged clutch which connects the flexible tube to this drum.

Figure 15:
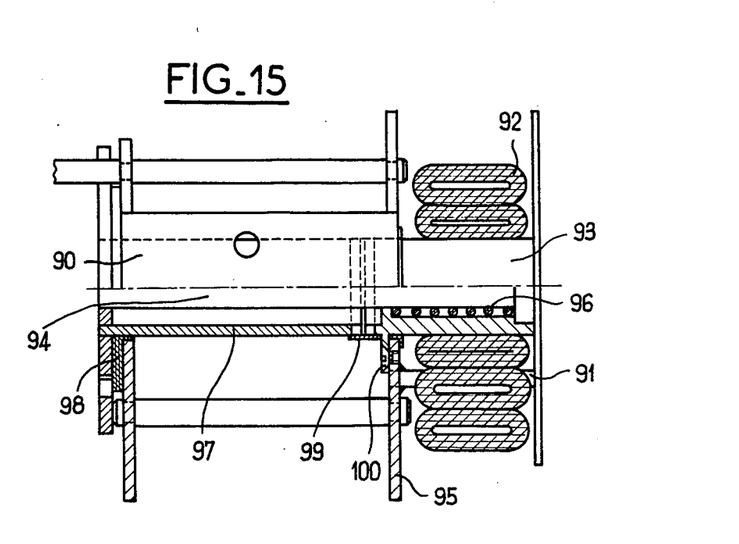
FIG. 15 is an axial longitudinal cross-section of a fifth rotary device according to the invention, which is intended to be combined with a safety belt roller so as to form a roller-retractor which is firmly held to the chassis of the vehicle.

FIG. 15 shows a fifth rotary device, the frame of which comprises two side plates which are connected by two cross-pieces and by a drilled base-plate (90), which makes it possible to fix this frame which is extended by a support plate (91) which makes it possible to fix the outside of the flexible tube (92) by means of a clamp and two screws. This flexible tube is partially flattened and is fixed to and rolled up in a spiral around the outer drum (93) which is centered on the axle (94) and on the side plate (95), which plate is equipped with a friction ring, a helical spring (96) being housed inside a bore of this outer drum and resting on the bottom of this bore and on the shoulder of the axle (94). The winding drum (97) is firmly held to the spiral spring and to the wheel, with dissymmetrical notches, of the roller, and the longitudinal displacement of the outer drum is caused by the action of the helical spring 96. The outer drum is guided, during rotation, by the flanged plate (98) and by the centering ring (99) which protects the ratchet teeth cut in the facing ends of the two drums (97) and (93). In normal operation, the outer drum is disengaged from the teeth of the winding drum by means of the shear screw (100) which temporarily holds the outer drum firmly to the side plate (95). When the flexible tube is pressurised, the rotation which follows tends to make the outer drum rotate, which causes the screw (100) to shear and causes the longitudinal displacement of this outer. The longitudinal displacement of the outer drum is caused by the action of the spring 96. The outer drum engages with the winding drum, the two engaged drums then being caused to rotate by the rotation of the flexible tube, and it must be noted in this respect that, for a given length of the tube, rolling in a spiral leads to a greater angular rotation of the drum than rolling in a helix.

All the application examples which are described above refer to the retraction of seat belts, which is the preferred application of the invention, but the rotary devices according to the invention make it possible to cause the rotation of a displaceable component which can be totally different from a safety belt and, in such different applications, modifications can be undertaken without going outside the scope of the present invention. The flexible tube can be pressurised, for example, either from a supply of compressed gas outside the device, or by means of a pressurised liquid, especially when the drive means, which essentially consists of this flexible tube, is used to cause the rotation of an axle which can control any apparatus requiring, in particular, a low angular distance of travel and a high drive torque. Such a device having a control axle can, for example, be derived from the rotary device shown in FIG. 13, because the flexible tube (84) is fixed directly to the central axle (82).

I claim:

1. A device for protecting people in a vehicle which comprises a frame fixed on the fixed chassis of the vehicle, a movable element capable of rotating relative to said frame, a displaceable element such as a safety belt connected to said movable element, a drive means for causing the rotation of the movable element with respect to the frame, the drive means comprising at least one flexible tube which in normal operation is rolled up, said flexible tube being connected at at least two portions thereof to said frame, and to said movable element, said tube being responsive to an increase in pressure to occupy greater volume and to acquire an expanded position, thereby tending to unroll and to thus rotate the movable element, pressurizing means responsive to signaling means setting free pressurized fluid, said pressurized fluid causing an increased pressure on said flexible tube, said flexible tube being joined to said pressurizing means.

2. A device according to claim 1, wherein the pressurized fluid is a gas.

3. The device according to claim 2, wherein the pressurized means is a gas generator.

4. The device according to claim 3, wherein the generator is a pyrotechnic gas generator.

5. The device according to claim 4, wherein the pyrotechnic gas generator is located inside the flexible tube, said pyrotechnic generator being fired electrically.

6. The device according to claim 1, wherein the flexible tube comprises at least one metal wall.

7. The device according to claim 1 or 6, wherein said flexible tube comprises at least one wall made of a rubbery material or a plastic 8. The device according to claim 7, wherein said flexible tube comprises a wall made of braided metal wires, said wall being covered in the interior by a wall made of a rubber material or a plastic.

9. The device according to claim 1, wherein at least one of said portions at which said flexible tube is connected, is situated towards one of the ends of said flexible tube.

10. The device according to claim 1, wherein said flexible tube is rolled up in a helix.

11. The device according to claim 1, wherein the flexible tube is rolled up in a spiral.

12. The device according to claim 1, 10 or 11, wherein the movable element is a rotatable drum and said flexible tube is rolled up inside said rotatable drum.

13. The device according to claim 1, 10 or 11, wherein said tube is rolled around an axle which is connected to the frame.

14. The device according to claim 1 or 9, wherein said flexible tube is bent back on itself to form two lengths before being rolled up, the two attachment portions being situated towards the two ends of said flexible tube, the central part of the flexible tube being engaged with the middle portion of said frame, the two lengths of said flexible tube being rolled up to form two helices of opposite pitch.

15. The device according to claim 1, wherein the frame is firmly fixed to said fixed chassis.

16. The device according to claim 1, wherein the frame is temporarily fixed to said fixed chassis, the frame is rotatable when the flexible tube is pressurized by fluid, and cooperates with the winding of the displaceable component.

17. The device according to claim 1 wherein the frame is connected to the chassis by frangible means, and after the flexible tube is pressurized, the frangible means are broken, the frame rotates, the flexible tube moves only in one direction and one-way blocking means for blocking movement of the frame in a reverse direction.

18. A device according to claim 1 or 17, wherein the movable element comprises a belt buckle.

19. A device according to claim 17, wherein the movable element is a winding drum.

20. A device according to claim 1, wherein the drive means additionally comprises a clutch component which is inserted between the flexible tube and the movable element, said clutch component being normally immobilized and upon the action of said pressurized fluid, being engageable with said movable element and connecting said movable element for rotation with the flexible tube.

21. The device according to claim 20, wherein the movable element is a winding drum and the clutch component comprises an element which is formed by part of the internal surface of the winding drum.

22. A device according to claim 20, wherein the clutch component comprises an element formed by one of the ends of the winding drum.

* * * * *